United States Patent [19]

Henriques et al.

[11] 4,370,920
[45] Feb. 1, 1983

[54] ROTATING BARBECUE GRILL

[76] Inventors: Joseph Henriques, 32 Hidden Brook Dr., Brookfield, Conn. 06804; Robert A. Bennett, 170 Sturbridge Rd., Easton, Conn. 06425

[21] Appl. No.: 842,617

[22] Filed: Oct. 17, 1977

[51] Int. Cl.³ .............................................. A47J 37/04
[52] U.S. Cl. ........................................ 99/339; 99/386; 99/423; 99/441; 99/443 C; 198/789
[58] Field of Search ................. 99/423, 441, 466, 339, 99/443 C, 386; 29/148.3; 46/218, 221; 74/25; 126/176 R, 181; 198/780, 789

[56] References Cited

U.S. PATENT DOCUMENTS

| 170,335 | 11/1875 | Booth | 198/780 |
|---|---|---|---|
| 1,078,769 | 11/1913 | Camp | 126/181 |
| 1,391,268 | 9/1921 | O'Brien | 99/423 X |
| 1,408,481 | 3/1922 | Spillman | 126/181 |
| 1,749,384 | 3/1930 | Koerber | 46/218 |
| 2,165,833 | 7/1939 | Bischof | 46/221 |
| 2,185,979 | 1/1940 | Dumas | 99/423 |
| 2,453,385 | 11/1948 | Rone | 99/423 |
| 2,577,963 | 12/1951 | Hagopian | 99/339 X |
| 2,604,842 | 7/1952 | Dolce | 99/423 |
| 2,708,871 | 5/1955 | Golinger | 99/423 |
| 3,325,879 | 6/1967 | Morkoski | 29/148.3 |
| 3,331,307 | 7/1967 | Hoffert | 99/423 |
| 3,331,308 | 7/1967 | Hoffert | 99/423 X |
| 3,472,156 | 10/1969 | Bardeau et al. | 99/423 |
| 3,854,392 | 12/1974 | Eason | 99/441 X |
| 3,997,761 | 12/1976 | Gabien | 219/463 |
| 4,005,646 | 2/1977 | Kruper | 99/427 |
| 4,011,804 | 3/1977 | Crockett | 99/421 H |
| 4,043,312 | 8/1977 | Kern | 126/41 R |
| 4,054,123 | 10/1977 | Corter | 126/137 |

FOREIGN PATENT DOCUMENTS

| 98778 | 7/1924 | Austria | 126/181 |
|---|---|---|---|
| 1965452 | 7/1971 | Fed. Rep. of Germany | 198/789 |
| 473505 | 11/1975 | U.S.S.R. | 99/441 |

Primary Examiner—Billy J. Wilhite

[57] ABSTRACT

A rotating barbecue grill for uniformly and automatically cooking frankfurters, sausages, hamburgers, steaks, and other food items through the use of rotating rods or rollers defining a grilling surface. One of the rods is directly driven by a motor with the remaining rods rotating in unison by a crank-type drive mechanism. A hot plate is positioned adjacent one of the end rollers so that flat items of food, such as hamburgers, which cannot be turned between the rollers, are moved by the rollers to the hot plate and deposited thereon so as to keep them warm without overcooking.

11 Claims, 6 Drawing Figures

ROTATING BARBECUE GRILL

BACKGROUND OF THE INVENTION

1. Field of the Invention

The present invention relates to barbecue grills and in particular to such grills having rotatable rods or rollers driven by a motor.

2. Description of the Prior Art

The prior art which the applicants believe to be the closest with respect to the subject matter of the present invention is set forth below in Table I.

TABLE I

| Patent No. | Inventor | Date of Issue |
| --- | --- | --- |
| 2,185,979 | Dumas | 1940 |
| 2,453,385 | Rone | 1948 |
| 2,604,842 | Dolce | 1952 |
| 3,331,307 | Hoffert | 1967 |
| 3,331,308 | Hoffert | 1967 |
| 3,472,156 | Bardeau et al | 1969 |
| 3,854,392 | Eason | 1974 |
| 3,997,761 | Gebien | 1976 |
| 4,005,646 | Kruper | 1977 |
| 4,011,804 | Crockett, Sr. | 1977 |

The relevance of these references is set forth below.

Referring to Table I, the '979 patent discloses a roasting device comprising rotable rolls 14 between which sausage-like food items may be placed. These rolls are driven by a worm gear mechanism unlike the mechanism of the present invention.

The '385 patent discloses a hamburger grill embodying a movable support on which the hamburgers or other meat items being grilled are supported and moved past the burner supplying heat to grill the food items. However, this support comprises a tray having arms 17 resting on links of two endless chains 7 driven by a motor-driven belt 13. Thus, this reference does not set forth rotating rods as disclosed in the present invention for moving hamburgers or other flat food items across the grilling area.

The '842 patent discloses a sausage grill having rods 26 driven by an endless belt 50. The plate 66 shown in FIG. 1 thereof is not for receipt of food items, as is the hot plate disclosed in the present invention, but is merely a hinge retaining plate for covering rods 26 when the unit is being moved. Furthermore, side angle irons 12 and 14 are mounted at each end of the rods 26 so as to provide a barrier for the food items, totally unlike the hot plate disclosed in the present invention.

The '307 and '308 patents both disclose a rotisserie having rollers for supporting sausages and other similar food items. These rollers are driven by gears 47 which in turn are driven by a motor. Every other gear engages a roller 19 so that these rollers turn in the same direction. These references also disclose the removal of one or more rollers or the substitution of skewers which may also be turned by the device. The gear driving arrangement of these references is totally unlike the driving mechanism of the present invention.

The '156 patent discloses a grilling or broiling apparatus wherein rolls 13 are rotated and inclined to be horizontal so that frankfurters or other cylindrical type food items placed on the uppermost portion of channel 62 formed between these rolls will move to the lowermost portion of the channel. In this way, the time that the frankfurter is exposed to the heat can be regulated thereby insuring automatic-type cooking. The rolls are driven by spur gear 35 cooperating with worm gear 36 unlike the mechanism for driving the rollers of the present invention.

The '392 patent discloses a wiener cooking attachment unit for rotisseries incorporating a number of rollers 13 each having a roller sprocket 34 driven by a serrated belt 32. This drive mechanism for the rollers is again unlike that disclosed in the present invention.

The '761 patent discloses a self-cleaning grill comprising a serpentine steel tubing for supporting food over a cooking fire and through which an electric current can be passed to burn food residues from the tubing. This reference does not disclose rotating tubing for turning food items nor the use of a hot plate associated with rollers for receipt of food items.

The '646 patent merely discloses a rotatable grill for demountably retaining food objects comprising two basket halves of similar size pivoted together so as to form a closed basket at their longitudinal sides. This device therefore does not disclose a grill with rotatable rollers nor a hot plate associated with these rollers.

Finally, the '804 patent discloses a grill tender for intermittently turning a horizontal grill of a standard tub-type charcoal brazier or broiler equipped with an elevated motor-driven skewer, spit or rotisserie bar elevated above the grill member. The device turns the grill 28 by means of a tine 54 interconnected to the rotary spit or bar 26. This device does not disclose rotating bars, rods or rollers nor does it disclose an associated hot plate. It also does not disclose the drive mechanism of the present invention for turning rods or rollers of a grill.

Consequently, applicants submit that of the prior art known to them, none of it taken alone or in combination with other known prior art, discloses or suggests the rotating barbecue grill set forth in the Disclosure, Drawings and Claims of this patent.

SUMMARY

A rotating barbecue grill according to the present invention comprises a plurality of parallel spaced apart rods or rollers defining a grilling surface for the placement of food thereon. Spacing of these rollers is such that cylindrically shaped food items, such as sausages and frankfurters, rest between adjacent rollers without falling therebetween. One of the rollers has an end shaped so as to be directly driven by an electric motor. The other end of this roller protrudes through a side member of the grill and has a crank-like termination rotatably interfitting with an elongated drive member. This drive member has a plurality of holes along its length dimensioned for rotatably receiving the crank-like ends of the other rollers. Turning the driven roller thereby imparts rotational movement to the remaining rollers so that all the rollers forming the grilling surface turn in the same direction-either clockwise or counter-clockwise.

A rectangular flat hot plate extends alongside one of the end rollers so that hamburgers and other flat shaped food items are moved across the grilling surface and deposited on the hot plate. The hot plate extends beyond the region of the grill in intimate association with the charcoal briquets or other fuel used in generating cooking heat, and thereby is not subject to direct fuel heat. The hot plate can therefore keep food items deposited on it warm without overcooking.

By initially positioning flat shaped food items at the end of the grilling surface away from the hot plate, the food is over the direct heat for a set length of time so as to insure adequate cooking on one side without the necessity for manually tending the food. Once the food has been deposited on the hot plate, the chef can then flip the item over, replacing it at the opposite end of the grilling surface so that when it is again deposited on the hot plate it is fully cooked and ready to eat. By varying the food distance from the hot plate, the chef can adjust the cooking time so as to obtain the desired amount of cooking.

Cylindrically shaped food items, such as hot dogs and sausages, are placed between adjacent rollers and thereby turned at a slow rate so as to be uniformly cooked without manually turning by the outdoor chef.

Due to the crank-like drive mechanism and the inexpensive and easy to fabricate rods, the rotating barbecue grill according to the present invention is inexpensively and easily fabricated.

OBJECTS OF THE INVENTION

Accordingly, it is a primary object of the present invention to provide a rotating barbecue grill comprising a plurality of rods or rollers defining a grilling surface, one of the rollers directly driven by a motor at one end and having a crank-like member at its other end rotatably interconnecting an elongated drive member so as to impart rotational movement into the crank-like ends of the remaining rollers so as to form a uniformly turning grilling surface for turning cylindrically shaped food, such as sausages, and for moving flat shaped food, such as hamburgers, at a steady rate across the grilling surface;

another object of the present invention is to provide a rotating barbecue grill of the above description incorporating a hot plate positioned alongside one of the end rollers forming the grilling surface so that flat food items such as hamburgers and the like will be moved across the grilling surface and deposited on the hot plate;

another object of the present invention is to provide a rotatating barbecue grill of the above description that is easily and inexpensively fabricated;

a further object of the present invention is to provide a rotating barbecue grill that is easy to clean;

other objects of the present invention will in part be obvious and will in part appear hereinafter.

THE DRAWINGS

For a fuller understanding of the nature and objects of the invention, reference should be had to the following detailed description taken in conjunction with the accompanying drawings, in which.

Figure 1:
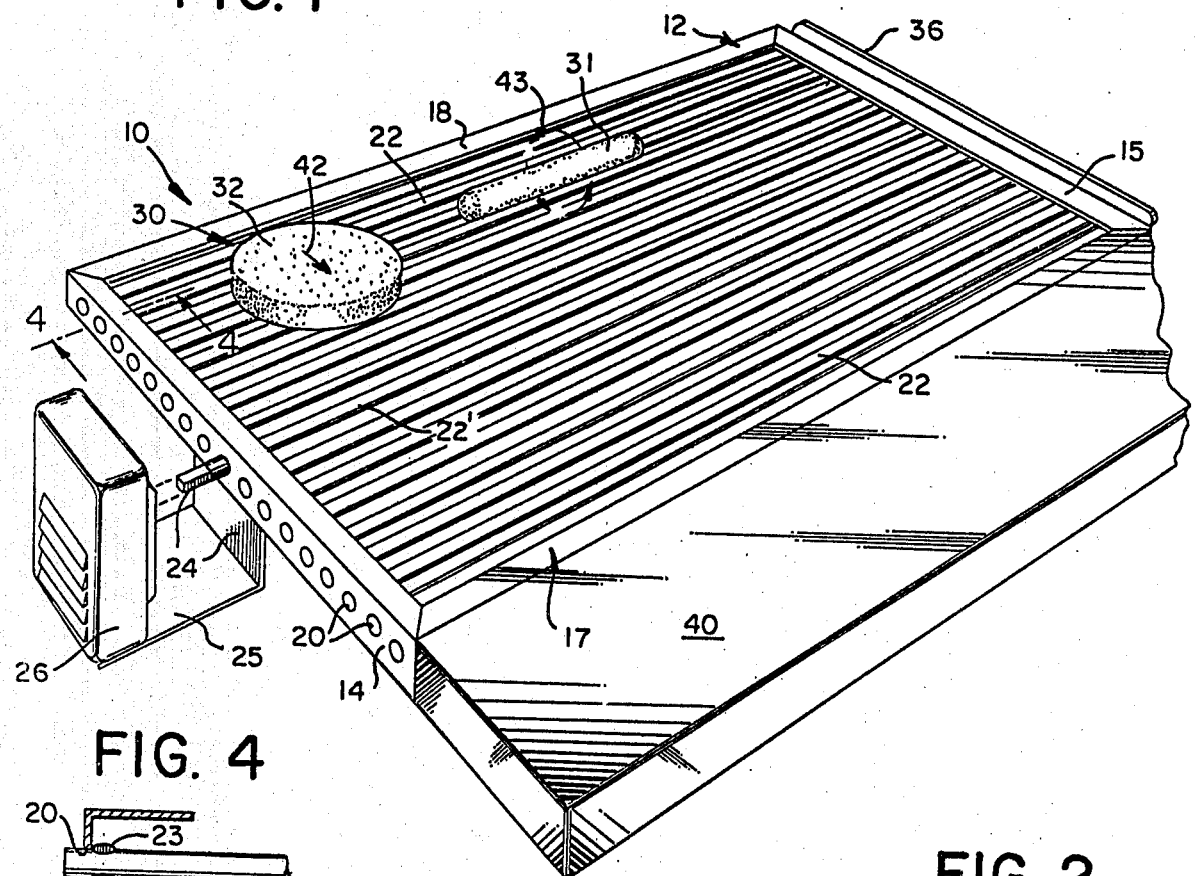
FIG. 1 is a partially cut away, assembly, perspective view of the rotating barbecue grill according to the present invention.
Figure 5:
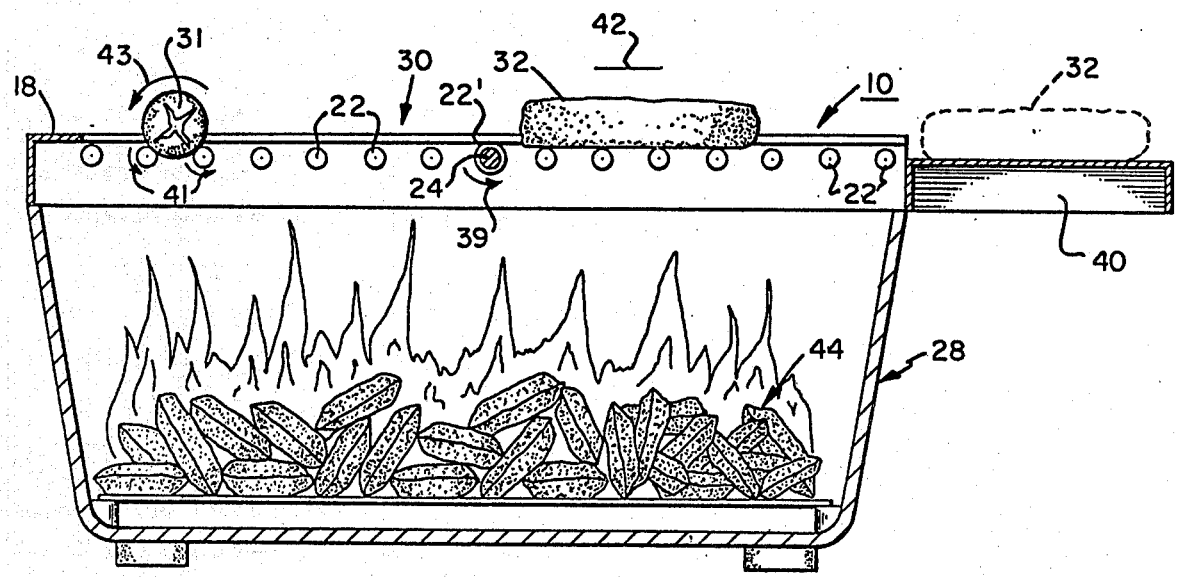
Figure 6:
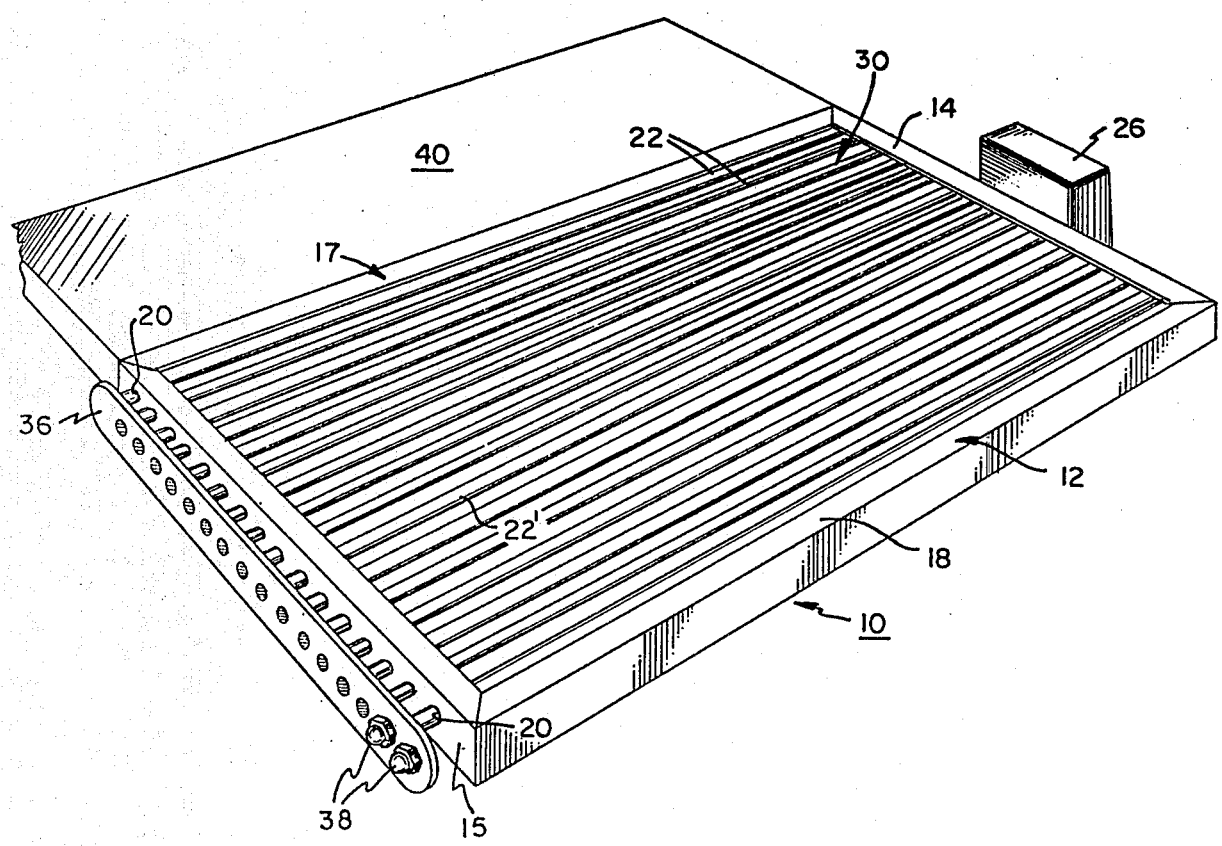

FIG. 5 is a cross-sectional side elevational view of the rotating barbecue grill shown in FIG. 1 placed over a barbecue pit, illustrating the position of the hot plate extending beyond the region directly heated by the charcoal briquets or other fuel within the barbecue pit; and FIG. 6 is a perspective view of the rotating barbecue grill shown in FIG. 1 but seen from the other end of the rollers depicted in FIG. 1.

DETAILED DESCRIPTION

As best seen in FIGS. 1 and 6, a rotating barbecue grill 10 according to the present invention comprises a peripheral framework 12 having a pair of side membes 14 and 15, a front member 17 and a rear member 18. Side members 14 and 15 incorporate a plurality of equally spaced aligned holes 20. This framework can be easily and inexpensively fabricated from standard sheet metal.

Figure 4:
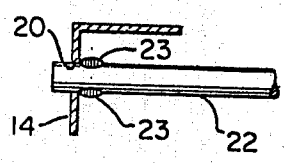
FIG. 4 is a cross-sectional enlarged view of one roller according to the present invention taken along line 4-4 in FIG. 1, illustrating how the roller can be inexpensively and easily rotatably mounted through a hole in a side member of the rotating grill.
Figure 2:
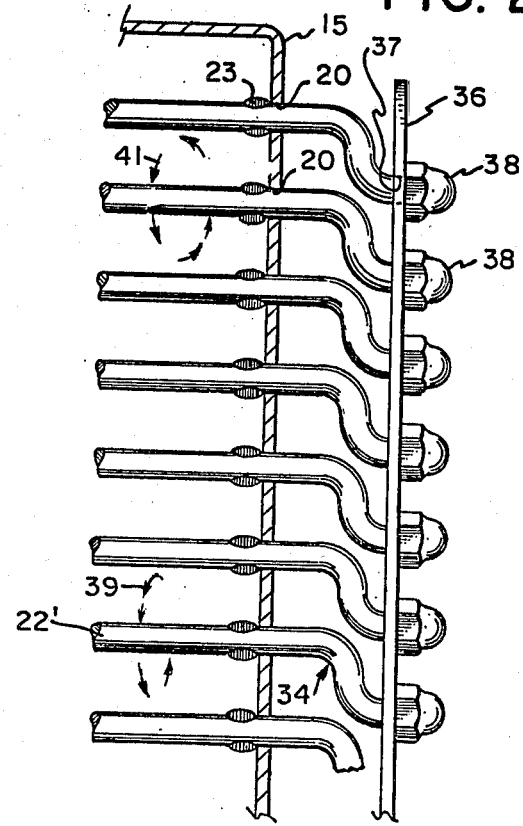
FIG. 2 is an enlarged, cross-sectional view of a number of rods or rollers used to form the rotating barbecue grill of the present invention, illustrating the roller directly driven by a motor and the manner in which this roller imparts rotational movement to the remaining rollers by means of an elongated drive member.

A plurality of elongated substantially cylindrical members 22 are rotatably mounted within corresponding aligned holes between side member 14 and side member 15. These members may be rods, rollers, tubing, or other similarly shaped parts. These members may be fabricated from any type of non-flammable, rigid, and non-toxic material such as stainless steel rods. As best seen in FIGS. 2 and 4, the rod may incorporate a raised area 23 at each end for preventing it from axially moving about hole 20. In this manner, axial movement of the rollers is minimized while allowing the rollers to freely rotate within the corresponding holes 20 in side members 14 and 15.

As seen in FIG. 1, a single rod 22' extends outwardly from side member 14 at a distance greater than the remaining rods or rollers. This rod 22' incorporates a squared off end 24 so as to be removably engageable and driven by a motor 26. Other shapes of end 24 may be utilized as long as the chosen shape mates with the drive portion of the motor. The motor is held stationary with respect to the grill by any standard means such as brackets 25 to grill 10 or to a barbecue pit or fireplace 28 on which the grill 10 is placed over (see FIG. 5).

As best seen in FIGS.1 and 6, the rods or rollers 22 combine to define a grilling surface 30 onto which food items such as a frankfurter 31 and a hamburger 32 can be placed.

As seen in FIGS. 1, 2, 5 and 6, rotation of drive rod 22' imparts rotation to the remaining rods 22 defining grilling surface 30. More particularly, the ends of drive rod 22' and rods 22 protrude through side member 15 and have a crank-like termination 34.

As best seen in FIGS. 1, 2 and 6, an elongated drive member 36 incorporates a plurality of holes 37 through which the ends of rods 22 and 22' rotatably interfit. A plurality of nuts 38 or similar fastening devices are attached to the ends of rods 22 and 22' so as to prevent drive member 36 from becoming detached.

Since the rotation of drive rod 22' as shown by arrow 39 is constrained by holes 20 at each end of drive member 14 and 15, rotation of the drive rod 22' necessarily imparts a reciprocating circular type motion to drive member 36, which imparts rotation to the crank-like terminations of the remaining rods 22; thereby turning rods 22 in the same direction as drive rod 22'. Thus, if drive rod 22' is turning as shown by arrow 39, the remaining rods similarly will turn between holes 20 of side members 14 and 15 as shown by arrows 41 (see also FIG. 5). This method of turning the rods forming grill 30 is inexpensive and simple, and does not need belts, gears and other energy transfer apparatus found in the prior art. Due to the simplicity of this drive mechanism, cleaning of the grill 10 is also easy.

Since the rotation of rods 22 and drive rod 22' is in the same direction, be it clockwise or counterclockwise, flat food items placed on top of adjacent rods or rollers are conveyed along the surface of the rollers at a predetermined speed based upon the angular velocity or turning rate of rods 22 and 22'. This movement is shown by arrow 42 in FIGS. 1 and 5. In this manner, another feature of the present invention unlike that of the prior art, is attained.

As best seen in FIGS. 1 and 5, at one end of the grill 30 a rectangular flat hot plate 40 is mounted to the grill. The grill and plate may be fabricated so as to allow hot plate 40 to be removably mounted to one end of the grill framework 12. The hot plate is positioned parallel to the grill rods 22' in a manner that the rotational direction of the rods will cause flat food items, such as hamburger 32, to move across the grilling surface onto hot plate 40 as shown by arrow 42. As shown in FIG. 5, the hot plate is preferably mounted slightly below the height rods 22 in order to facilitate the depositing of food from the rollers.

Due to this movement of the flat shaped food, the outdoor chef can place his hamburgers, steaks or the like at the far end of the grill near frame member 18, knowing that by the time they are deposited on the hot plate 40, they have been adequately cooked. If the chef prefers to have some items cooked rare or medium rare, he may place them on the grilling surface somewhere between frame member 18 and frame member 17 so as to obtain the desired amount of cooking. Once these items have been deposited on hot plate 40, the outdoor chef may flip them over and replace them where he had formerly placed them to insure that the other side of the item is cooked in like manner.

Cylindrical food items, such as hot dog 31, are placed between adjacent rollers 22. Since the rollers turn in the same direction, the frankfurter or other cylindrical food items, will rotate about its longitudinal axis as shown by arrow 43. In this manner, uniform cooking of the hot dog or other similar food items is obtained without the chef having to repetitively turn such foods.

Figure 3:
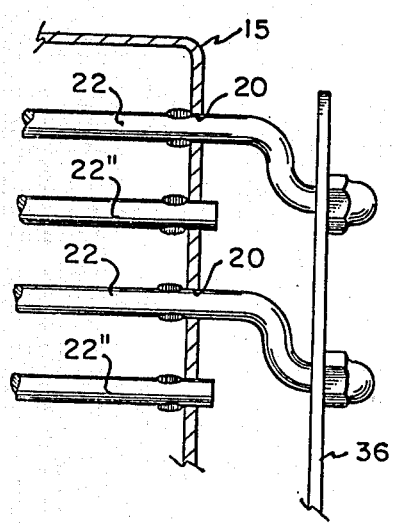
FIG. 3 is an enlarged cross-sectional view, similar to that shown in FIG. 2, of a number of rods or rollers used to form a modification of the rotating barbecue grill.

An alternative embodiment of the rods and drive mechanism is shown in FIG. 3. In this embodiment, alternate rods 22" are not interconnected to drive bar 36, but are allowed to freely rotate within holes 20 of side members 14 and 15. The remaining rods are driven by drive rod 22' in the same manner as described earlier and shown in FIG. 2.

This alternate embodiment still rotates cylindrically shaped food items in a direction as shown by arrow 43 (see FIGS. 1 and 5) since there remains one rod 22 or 22' which contacts the food item. Similarly, flat food items are still moved across the grilling surface 30 as shown by arrow 42 since there is at least one rotating rod or roller 22 or 22' contacting the item. This embodiment of the invention is less expensive to fabricate than the previously described unit since only half the rods or rollers have crank-like terminations 34.

In order to insure that the flat food items are deposited on the hot plate 40, this alternate embodiment should have a driven rod 22 adjacent the plate.

As is best seen in FIG. 5, the rotating barbecue grill 10 of the present invention is positioned so that the grill 30 is placed over the barbecue pit or fireplace 28 enclosing the barbecue briquets or other similar type fuel item 44. The hot plate 40 is preferably positioned so as not to be directly over the barbecue pit and thereby does not receive direct heat from the briquets or other fuel. Therefore, the items deposited on the hot plate are kept warm by the plate being maintained in a warm state by the conduction of heat through the barbecue pit to the hot plate 40.

As is readily apparent to one of ordinary skill in the barbecue art, which of course is virtually every outdoor chef, the present rotating barbecue grill may be used not only with fuel such as barbecue briquets, charcoal and the like, but also with gas powered outdoor barbecue fireplaces that are presently commercially available.

Thus, what has been described is a rotating barbecue grill for automatically cooking both flat and cylindrical-type food items on a grilling surface formed from uniformly rotating rods or rollers. The rollers are uniformly turned in the same direction by each incorporating crank-like terminations at one end which rotatably interfit with an elongated drive member so that driving one rod via a motor or other apparatus imparts the rotation of the remaining rods. The rotation of the rods forming the grill is thus obtained in a very simple and inexpensive manner. Alternatively, every other rod may be driven with the remaining rods free to rotate. Furthermore, the present invention includes a hot plate positioned adjacent and parallel to the roller at the frontmost end of the grill so as to catch flat food items such as steaks and hamburgers as they slowly travel across the grilling surface. In this manner such food items can be automatically cooked to a predetermined amount and deposited on the hot plate for either flipping over so as to cook their other side or for leaving on the hot plate in order to keep them warm.

It will thus be seen that the objects set forth above, among those made apparent from the preceding description, are efficiently attained and, since certain changes may be made in carrying out the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed is:

1. A rotating barbecue grill for use with a motor, comprising:
 (A) a peripheral framework including two oppositely positioned apertured side members parallel to each other with their respective apertures aligned with each other;
 (B) an elongated substantially cylindrical member rotatably mounted through aligned apertures in said side members, having a first end protruding outwardly from the first side member, said first end shaped for removable continuous rotational driving engagement by said motor, and having its other end protruding from said second side member, with either end having a crank-like portion;

(C) a plurality of elongated substantially cylindrical members passing through respective aligned apertures in the side members, each having a crank-like portion at the end thereof, corresponding to the end of the driven cylindrical member having the crank-like portion, these members in combination with the driven cylindrical member defining a grilling surface for the placement of cylindrically shaped food items between adjacent cylindrical members and for the placement of flat sided food items on top of at least two adjacent cylindrical members;

(D) a drive member incorporating another plurality of apertures for rotatably receiving the crank-like portions of the driven cylindrical member and the other cylindrical members so that continuous rotational movement of the crank-like portion of the driven cylindrical member imparts similar continuous rotational movement in the crank-like portions of the remaining elongated members; and (E) a hot plate positioned parallel to one of the elongated members having only one adjacent elongated member so that flat sided food items placed on the elongated members move across the grilling surface and are deposited on the hot plate;

whereby rotation of the driven cylindrical member causes all of the interconnected remaining elongated members to turn in the same direction and with the same speed as the driven member so as to form a grilling surface with rotating members; and whereby cylindrically shaped food items such as frankfurters are automatically turned by the cylindrical members while flat sided food items such as hamburgers are moved across the grilling surface onto the hot plate.

2. A rotating barbecue grill as defined in claim 1, wherein said hot plate has an upper surface having a substantially flat, rectangular shape and is positioned slightly below the plane defined by the grilling surface, so as to facilitate the depositing of food items thereon.

3. A rotating barbecue grill for use with an electric motor, comprising:

(A) a plurality of parallel spaced apart cylindrical members, at least every other cylindrical member having a crank-like termination at one end thereof, said cylindrical members combining to define a grilling surface for the placement of food items thereon, and at least one of said cylindrical members with a crank-like termination including means for engaging with said electric motor so as to be continuously rotationally driven by the electric motor;

(B) means, for maintaining the cylindrical members in the spaced apart parallel relationship to each other while allowing the cylindrical members to turn about their longitudinal axis;

(C) a drive member rotatably interconnected with each of the crank-like terminations of the cylindrical members so as to impart continuous rotational movement from the cylindrical member driven by the motor to the other cylindrical members and thereby cause these cylindrical members to turn in the same direction at a uniform speed; and (D) a hot plate mounted to the means for maintaining the parallel spaced relationship of the cylindrical members and positioned adjacent to one of the cylindrical members defining the grilling surface whose upper direction of rotation is toward the hot plate so that flat food items placed upon the grilling surface move across the surface at a uniform rate and are deposited on the hot plate.

4. A rotating barbecue grill as defined in claim 3, wherein the hot plate is mounted to the means for maintaining the parallel spaced relationship of the cylindrical members at a height slightly beneath the plane defined by the grilling surface.

5. A rotating barbecue grill as defined in claim 4, wherein the hot plate has a substantially flat elongated rectangular shape.

6. A barbecue device for cooking foods comprising:

(A) means for containing a source of heat;

(B) an electric motor;

(C) a plurality of spaced apart rods or rollers, at least every other rod having a crank-like termination at one end thereof, said rods combining to form a grilling surface for the placement of food items thereon so that cylindrically-shaped food items, such as sausages, rest atop adjacent rods and flat sided food items, such as hamburgers, are supported across at least two adjacent rods, and at least one of said rods with a crank-like termination including means for engaging with the electric motor so as to be continuously rotationally driven by the electric motor;

(D) means, for maintaining the rods in the spaced apart parallel relationship to each other while allowing the rods to turn about their longitudinal axis;

(E) means, for maintaining the electric motor in engagement with the rod to be driven by the electric motor;

(F) a drive member rotatably interconnected with each of the crank-like terminations of the rods so as to impart continuous rotational movement from the rod driven by the motor to the remaining rods having crank-like terminations and thereby cause all the rods with crank-like terminations to turn in the same direction at a uniform speed, with the rods not having crank-like terminations free to rotate about their longitudinal axis; and (G) a hot plate mounted to the means for maintaining the parallel spaced relationship of the rods and positioned adjacent to one of the end rods defining the grilling surface whose upper direction of rotation is toward the hot plate, so that flat food items placed on the grilling surface move across the surface and are deposited on the hot plate;

whereby the cylindrically shaped food items, such as sausages, are automatically turned by the rods driven by the rod engaged with the electric motor while flat-sided foods, such as hamburgers, are moved across the grilling surface by these rods.

7. A barbecue device as defined in claim 6, wherein the hot plate is mounted to the means for maintaining parallel spaced relationship of the rods at a height slightly beneath the plane defined by the grilling surface so as to facilitate depositing of flat food items on the hot plate.

8. A barbecue device as defined in claim 7, wherein the means for maintaining the spaced apart parallel relationship of the rods comprises a framework having two side members, each side member having a plurality of holes respectively alignable with the holes of the other side member, each rod of the plurality of rods rotatably interfitting with one pair of aligned holes in the two side members, the framework further comprising two cross members for maintaining spaced apart rigidity of the two side members.

9. A barbecue device as defined in claim 8, wherein the rods each further comprise raised portions at opposite ends of the rod adjacent to holes in the side members for preventing axial movement of the rods with respect to the side members.

10. A barbecue device as defined in claim 9, wherein the framework is fabricated from sheet metal and is positioned on the means for containing heat so that the hot plate extends beyond the heat containing means and not in direct convection heating engagement therewith.

11. A barbecue device as defined in claim 6, wherein the hot plate is further positioned with respect to the means for containing the source of heat so as not to be in direct convection heating engagement with the source of heat.

* * * * *